US012586386B2

(12) United States Patent
Choi

(10) Patent No.: US 12,586,386 B2
(45) Date of Patent: Mar. 24, 2026

(54) OBJECT RECOGNITION APPARATUS FOR AN AUTONOMOUS VEHICLE AND AN OBJECT RECOGNITION METHOD THEREFOR

(71) Applicants: HYUNDAI MOTOR COMPANY, Seoul (KR); KIA CORPORATION, Seoul (KR)

(72) Inventor: Jong Hyun Choi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 337 days.

(21) Appl. No.: 18/508,904

(22) Filed: Nov. 14, 2023

(65) Prior Publication Data

US 2024/0338949 A1     Oct. 10, 2024

(30) Foreign Application Priority Data

Apr. 7, 2023     (KR) ........................ 10-2023-0046295

(51) Int. Cl.
*G06V 20/58*     (2022.01)
*G06V 10/24*     (2022.01)
*G06V 10/48*     (2022.01)
*G06V 10/82*     (2022.01)

(52) U.S. Cl.
CPC ............ *G06V 20/58* (2022.01); *G06V 10/242* (2022.01); *G06V 10/48* (2022.01); *G06V 10/82* (2022.01)

(58) Field of Classification Search
CPC ........ G06V 20/58; G06V 10/82; G06V 10/48; G06V 10/242
See application file for complete search history.

(56) References Cited

FOREIGN PATENT DOCUMENTS

| | | | |
|---|---|---|---|
| KR | 102565826 B1 | 8/2023 | |
| WO | WO-2021077984 A1 * | 4/2021 | ........... G06F 18/214 |
| WO | WO-2022180479 A1 * | 9/2022 | ............. G06N 3/045 |

* cited by examiner

*Primary Examiner* — Stephen R Koziol
*Assistant Examiner* — Raven Simone Jones
(74) *Attorney, Agent, or Firm* — Lempia Summerfield Katz LLC

(57) ABSTRACT

An object recognition apparatus and method for an autonomous vehicle are disclosed. The object recognition apparatus includes a processor and storage. The processor: trains a first network model based on an image; corrects distortion and rotation of the image; generates at least one distorted image based on the corrected image; trains a feature transfer module based on a feature extracted from the corrected image and a feature extracted from the at least one distorted image; inserts the feature transfer module into the first network model; and performs fine-tuning for a second network model including the feature transfer module based on the at least one distorted image.

20 Claims, 9 Drawing Sheets

OBJECT RECOGNITION
APPARATUS
100

PROCESSOR
110

STORAGE
120

410

420

$[I_{raw}]$ $[I_{undist,rect}]$

NETWORK MODEL
200

430

$[R_{undist,rect}^{3D}]$

OBJECT RECOGNITION APPARATUS FOR AN AUTONOMOUS VEHICLE AND AN OBJECT RECOGNITION METHOD THEREFOR

CROSS-REFERENCE TO RELATED APPLICATION

This application claims the benefit of priority to Korean Patent Application No. 10-2023-0046295, filed in the Korean Intellectual Property Office on Apr. 7, 2023, the entire contents of which are incorporated herein by reference.

TECHNICAL FIELD

The present disclosure relates to an object recognition apparatus for an autonomous vehicle and an object recognition method therefor, and more particularly, relates to technologies for recognizing an object based on an image using a deep-learning network model.

BACKGROUND

Artificial intelligence technology is a technology for implementing a computer system capable of performing work requiring human intelligence such as human learning ability, reasoning ability, or perception ability. Machine learning is an algorithm technology that self-learns the characteristics of input data as one field of the artificial intelligence technology. Deep learning may be machine learning based on an artificial neural network.

As artificial intelligence technology is applied to autonomous driving, a technology has been developed for recognizing an object present in a three-dimensional (3D) space around a vehicle that is traveling using a deep-learning network model and performing control based on the object recognition result.

SUMMARY

The present disclosure has been made to solve the above-mentioned problems occurring in the prior art while advantages achieved by the prior art are maintained.

Aspects of the present disclosure provide an image-based three-dimensional (3D) object recognition apparatus that is sufficiently robust to a change in parameter of a camera loaded into a vehicle and an object recognition method therefor.

Another aspect of the present disclosure provides an object recognition apparatus for an autonomous vehicle for reducing an excessive amount of calculation. The image obtained while a vehicle is traveling should be corrected in real-time based on a parameter of a camera. Another aspect of the present disclosure provides reducing deterioration in performance as processing is delayed by a real-time correction process. Further aspects of the present disclosure provide object recognition methods therefor.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, an object recognition apparatus for an autonomous vehicle may include a processor and storage. The processor may be configured to: train a first network model based on an image; correct distortion and rotation of the image; generate at least one distorted image based on the corrected image; train a feature transfer module based on a feature extracted from the corrected image and a feature extracted from the at least one distorted image; insert the feature transfer module into the first network model; and perform fine-tuning for a second network model including the feature transfer module based on the at least one distorted image.

In an embodiment, the processor may be configured to input a specified distortion value and a specified rotation value to the corrected image to generate the at least one distorted image in which distortion and rotation are generated.

In an embodiment, the corrected image may be corrected using at least one of an intrinsic parameter or an extrinsic parameter of a camera of the autonomous vehicle. The processor may be configured to generate the at least one distorted image using an inverse transform of an operation corresponding to the correction.

In an embodiment, the processor may be configured to store a mapping function indicating a relationship of the inverse transform and to generate a mask image indicating an unmapped area on the at least one distorted image and store the mask image together with the mapping function.

In an embodiment, the processor may be configured to train the feature transfer module to make the feature extracted from each distorted image of the at least one distorted image the same as the feature extracted from the corrected image.

In an embodiment, the feature transfer module may include a feature transfer network model. The feature transfer network model may be trained based on a loss function including a shape-based loss, a mapping loss, a contra loss, and a discern loss.

In an embodiment, the processor may be configured to multiply a loss of an unmapped area on the distorted image by "0" and multiply a loss of a mapped area by "1" to calculate a value of the loss function.

In an embodiment, a size of a kernel of an encoder on each of initial three layers of the feature transfer network model may be determined based on a size of a feature input to the feature transfer network model.

In an embodiment, the processor may be configured to: receive an image obtained by means of a camera of the autonomous vehicle while the autonomous vehicle is traveling; input the received image to the second network model; and obtain an object recognition result from the second network model.

In an embodiment, the object recognition result may include a location and a type of an object present in a three-dimensional (3D) space.

According to another aspect of the present disclosure, an object recognition method performed by an object recognition apparatus for an autonomous vehicle may include: training a first network model based on an image; correcting distortion and rotation of the image; generating at least one distorted image based on the corrected image; training a feature transfer module based on a feature extracted from the corrected image and a feature extracted from at least one distorted image; inserting the feature transfer module into the first network model; and performing fine-tuning for a second network model including the feature transfer module based on the at least one distorted image. Each of the first network model and the second network model may be a deep-learning network model for performing object recognition based on an image.

In an embodiment, generating the at least one distorted image may include inputting a specified distort value and a specified rotation value to the corrected image to generate the at least one distorted image in which distortion and rotation are generated.

In an embodiment, the corrected image may be corrected using at least one of an intrinsic parameter or an extrinsic parameter of a camera of the autonomous vehicle. Generating the at least one distorted image may include generating the at least one distorted image using the inverse transform of the operation corresponding to the correction.

In an embodiment, the object recognition method may further include storing a mapping function indicating a relationship of the inverse transform. The method may also include generating a mask image indicating an unmapped area on the distorted image and storing the mask image together with the mapping function.

In an embodiment, the training of the feature transfer module may include training the feature transfer module to make the feature extracted from each distorted image of the at least one distorted image the same as the feature extracted from the corrected image.

In an embodiment, the feature transfer module may include a feature transfer network model. The feature transfer network model may be trained based on a loss function including a shape-based loss, a mapping loss, a contra loss, and a discern loss.

In an embodiment, training the feature transfer module may include multiplying a loss of an unmapped area on the distorted image by "0" and multiplying a loss of a mapped area by "1" to calculate a value of the loss function.

In an embodiment, a size of a kernel of an encoder on each of initial three layers of the feature transfer network model may be determined based on a size of a feature input to the feature transfer network model.

In an embodiment, the object recognition method may further include: receiving an image obtained by means of a camera of the autonomous vehicle while the autonomous vehicle is traveling; inputting the received image to the second network model; and obtaining an object recognition result from the second network model.

In an embodiment, the object recognition result may include a location and a type of an object present in a 3D space.

BRIEF DESCRIPTION OF THE DRAWINGS

The above and other objects, features, and advantages of the present disclosure should be more apparent from the following detailed description taken in conjunction with the accompanying drawings, in which.

DETAILED DESCRIPTION

Figure 1:
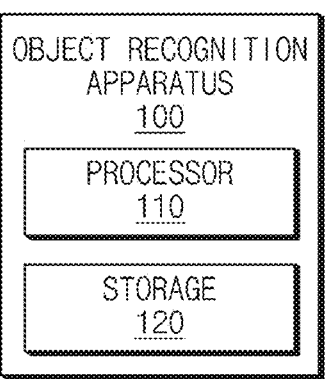
FIG. 1 is a block diagram illustrating a configuration of an object recognition apparatus according to an embodiment of the present disclosure.

Hereinafter, some embodiments of the present disclosure are described in detail with reference to the accompanying drawings. In adding the reference numerals to the components of each drawing, it should be noted that the identical component is designated by the identical numerals even when they are displayed on other drawings. Further, in describing the embodiments of the present disclosure, a detailed description of well-known features or functions has been ruled out in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application. When a component, device, element, or the like, of the present disclosure, is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-9.

FIG. 1 is a block diagram illustrating a configuration of an object recognition apparatus according to an embodiment of the present disclosure.

Referring to FIG. 1, an object recognition apparatus 100 according to an embodiment of the present disclosure may include a processor 110 and storage 120. The object recognition apparatus 100 may be implemented in a vehicle (e.g., an autonomous vehicle). The object recognition apparatus 100 may be integrally configured with control units in the vehicle or may be implemented as a separate device to be connected with the control units of the vehicle by a separate connection means.

The processor 110 may be operatively connected with the storage 120. The processor 110 may execute instructions stored in the storage 120 to perform operations described below. For example, the processor 110 may train a network model for recognizing an object based on an image and may recognize the object based on the trained network model. The network model may be, for example, a deep-learning network model.

The processor 110 may train the network model based on an image, distortion and rotation of which are corrected. The network model may be a three-dimensional (3D) object recognizer, which recognizes an object that is present in a 3D space based on an image. For example, the network model may be composed of a feature extractor and a decoder.

The processor 110 may pre-train the network model by using the image, the distortion and the rotation of which are corrected, as training data. The image, the distortion and the rotation of which are corrected, may be, for example, an image in which distortion and rotation of an image obtained by the camera loaded into the vehicle while the vehicle is traveling are corrected. For example, the distortion may be generated by a form of a lens of the camera. For example, the rotation may be generated by the rotation of the vehicle, which is generated at an image acquisition time.

The processor 110 may train the network model by using the image, the distortion and the rotation of which are corrected, as training data. Thus, the processor 110 trains the network model using pieces of data of cameras, each of which has different direction or distortion. The processor 110 may train the network model by using the image, the distortion and the rotation of which are corrected, as training data to train a relationship between a two-dimensional (2D) image space and a 3D space as one. Thus, the performance of the network model for the image, the distortion and the rotation of which are corrected, may be improved.

The processor 110 may generate at least one distorted image based on the corrected image. The corrected image in the present disclosure may be referred to as training data used for pre-training of the network model. For example, the processor 110 may input a specified distortion value "K" and a specified rotation value "R" to the corrected image to generate at least one distorted image in which distortion and rotation of which are generated. The specified rotation value may include, for example, yaw, pitch, and roll. The yaw refers to rotation with respect to an axis on a vertical plane perpendicular to a movement direction. The pitch refers to rotation with respect to an axis on a horizontal plane perpendicular to the movement direction. The roll refers to rotation with respect to an axis on a horizontal plane parallel to the movement direction.

For example, the corrected image may be corrected using a distortion parameter of each camera that is preset. For example, the corrected image may be corrected using at least one of an intrinsic parameter or an extrinsic parameter of the camera of the vehicle. The intrinsic parameter of the camera may include, for example, a parameter associated with the rotation of the camera. The extrinsic parameter of the camera may include, for example, a parameter associated with a vehicle dynamic control (VDC) device and a parameter associated with an automatic calibration (AOC) device, which automatically calibrates a gradient of the vehicle, or the like.

For example, the processor 110 may generate at least one distorted image using an inverse transform of the operation corresponding to the correction. The operation corresponding to the correction may be, for example, a homography operation. The processor 110 may input the specified distortion value "K" and the specified rotation value "R" to the corrected image using the inverse transform of the operation corresponding to the correction to generate the at least one distorted image. For example, the processor 110 may set the distortion value "K" based on the preset distortion parameter of each camera. For example, the processor 110 may finely adjust the rotation value "R" to be similar to a behavior of the vehicle and may input a plurality of different rotation values to a plurality of distorted images. The processor 110 may configure an image set including the corrected image and the at least one distorted image generated from the corrected image.

For example, the processor 110 may store a mapping function indicating an inverse transform relationship in the storage 120. The mapping function may be a function for converting the corrected image into a distorted image. For example, the processor 110 may generate a mask image indicating an unmapped area on the distorted image and may store the mask image together with the mapping function. For example, the mask image may indicate a free space on the distorted image that is generated by rotation. For example, the free space may include an outer part of the image.

The processor 110 may train a feature transfer module based on a feature extracted from the corrected image and a feature extracted from each distorted image of the at least one distorted image. The processor 110 may train the feature transfer module to make the feature extracted from each distorted image of the at least one distorted image the same as the feature extracted from the corrected image. The network model may perform 3D object recognition based on the feature extracted from the image. For example, when the features extracted from each of the distorted images and the corrected image are the same as each other, 3D object recognition results for the same screen may be obtained to be the same as each other, regardless of whether correction is performed. The processor 110 may train the feature transfer module to make the feature extracted from the distorted image the same as the feature extracted from the corrected image. Thus, the same feature as the feature extracted from the corrected image is extracted even without correcting the image, using the trained feature transfer module.

For example, the feature transfer module may include a feature transfer network model. The feature transfer network model may be, for example, a deep-learning network model. The feature transfer network model is not limited to a form described below. For example, the feature transfer network model may be in the form of a transformer or multi-layer perceptron (MLP). The feature transfer network model may include an encoder and a decoder for each layer corresponding to each feature. For example, a size of a kernel of the encoder on each of the initial three layers of the feature transfer network model may be determined (or set) based on a size of a feature input to the feature transfer network model. For example, the size of the kernel of the encoder on each of the initial three layers of the feature transfer network model may be determined as a ¼ size of the feature input to the feature transfer network model. When the size of the kernel of the encoder is set to the ¼ size of the input feature, the feature transfer network model may learn a mapping relationship between points, which are distant from each other on an image space, unlike the case where the size of the kernel is set to 3×3 or 5×5.

For example, the processor 110 may train the feature transfer network model using the image set including the corrected image and the at least one distorted image generated from the corrected image. For example, the feature transfer network model may be trained based on a loss function $L_{total}$ including a shape-based loss $L_{shape}$, a mapping loss $L_{map}$, a contra loss $L_{contra}$, and a discern loss $L_{disc}$.

The processor 110 may calculate the loss function $L_{total}$ based on Equation 1 below.

$$L_{total} = -L_{disc} + L_{shape} + L_{contra} + L_{map} \qquad \text{Equation 1}$$

The processor 110 may calculate each loss based on the feature extracted from the at least one distorted image and the feature extracted from the corrected image. The shape-based loss $L_{shape}$ may indicate an average of differences between a shape of the result of outputting the feature extracted from each distorted image and a shape of the result of outputting the feature extracted from the corrected image. The mapping loss $L_{map}$ may indicate an average of mapping errors between the feature extracted from each distorted image and the feature extracted from the corrected image. The contra loss $L_{contra}$ may indicate an average of differences between a statistical distribution of the feature extracted from each distorted image and a statistical distribution of the feature extracted from the corrected image. The discern loss $L_{disc}$ may indicate an average of degrees for discriminating that the feature extracted from each distorted image is the feature extracted from the corrected image. According to Equation 1 above, the larger the discern loss $L_{disc}$ and the smaller the shape-based loss $L_{shape}$, the mapping loss $L_{map}$, and the contra loss $L_{contra}$, the smaller the value of the loss function.

For example, the processor 110 may multiply a loss of the unmapped area on the distorted image by "0" and may multiply a loss of the mapped area by "1", thus calculating a value of the loss function. For example, the processor 110 may identify the unmapped area on the distorted image based on the mask image stored together with the mapping function. The processor 110 may process the loss of the unmapped area as "0" and may calculate only a loss of the mapped area, such that the feature transfer module simulates the mapping relationship itself.

The processor 110 may train the feature transfer network model such that the value of the loss function calculated based on Equation 1 above is minimized, thus training the feature transfer network model. A discerner should be unable to distinguish the feature extracted from the corrected image from the feature extracted from the distorted image This is because shapes of the results of outputting the features are the same, statistical distributions of the features are the same, and a mapping relationship between the features is similar to a mapping relationship between images.

For example, the processor 110 may change the loss function based on a user input or may assign a weight to at least one item (e.g., the shape-based loss $L_{shape}$, the mapping loss $L_{map}$, the contra loss $L_{contra}$, or the discern loss $L_{disc}$) constituting the loss function.

The processor 110 may insert the feature transfer module into the network model. For example, the processor 110 may insert the feature transfer module into a pre-trained network model. As the processor 110 inserts the feature transfer module into the pre-trained network model, the network model may be composed of a feature extractor, a feature transfer module, and a decoder. For example, the network model may further include a feature transfer module in a network model before pre-training.

The processor 110 may perform fine-tuning for the network model including the feature transfer module based on the at least one distorted image. The fine-tuning in the present disclosure may refer to training a full network model (e.g., the network model including the feature transfer module) once more using few iterations (e.g., the number of times of training).

The processor 110 may receive an image obtained by means of the camera of the autonomous vehicle while the vehicle is traveling. For example, the processor 110 may receive an image from the camera of the autonomous vehicle. The processor 110 may input the image received from the camera to the network model including the feature transfer module. The processor 110 may input the image received from the camera to the network model without change without correcting the image received from the camera.

The processor 110 may obtain an object recognition result from the network model including the feature transfer module. After correcting the distortion and rotation of the image received from the camera, the processor 110 may obtain the same object recognition result as the result of performing object recognition for the corrected image. The object recognition result may include, for example, a location and a type of an object which is present in a 3D space.

For example, the processor 110 may transmit the object recognition result to a vehicle control device of the autonomous vehicle. The vehicle control device of the autonomous vehicle may control the autonomous vehicle based on the object recognition result. The processor 110 may provide an object recognition result of the same performance as an object recognition result based on the corrected image in real-time while performing object recognition by using the source of the distorted image without change. Thus, autonomous driving performance of the autonomous vehicle is improved based on the object recognition.

The storage 120 may store instructions executed by the processor 110. The storage 120 may store data necessary for the processor 110 to perform an operation. For example, the storage 120 may store a network model for recognizing an object based on an image. For example, the storage 120 may store the corrected image and the distorted image generated based on the corrected image as training data of the network model. For example, the storage 120 may store a network model before being trained using the training data.

The storage 120 may store data or information processed by the processor 110. For example, the storage 120 may store a network model after being trained using the training data. For example, the storage 120 may store the features extracted from the corrected image and the distorted image. For example, the storage 120 may store an object recognition result (e.g., a location and/or a type of the object) obtained by inputting the source of the image obtained by means of the camera of the vehicle (e.g., raw data or an image before correction) to the trained network model.

The above-mentioned embodiment implements the 3D object recognition apparatus. However, according to various embodiments, the above-mentioned method for training and operating the network model may be applied to other network models, each of which outputs 3D information based on an image, for example, estimating a depth or predicting occupancy.

Figure 2:
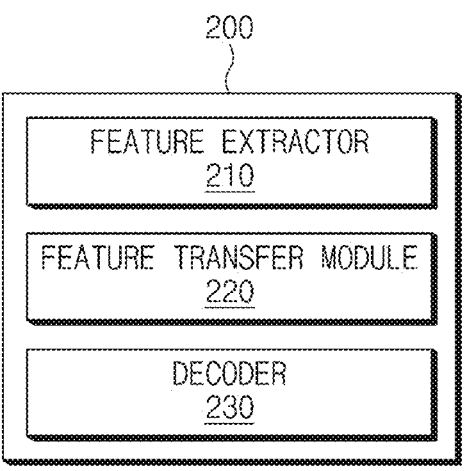
FIG. 2 is a block diagram illustrating a configuration of a network model of an object recognition apparatus according to an embodiment of the present disclosure.

FIG. 2 is a block diagram illustrating a configuration of a network model of an object recognition apparatus according to an embodiment of the present disclosure. A network model 200 shown in FIG. 2 may be, for example, a network model of an object recognition apparatus 100 of FIG. 1. Operations of the network model 200, which are described below, may be performed by the object recognition apparatus 100 of FIG. 1 or a processor 110 of the object recognition apparatus 100.

Referring to FIG. 2, the network model 200 may include a feature extractor 210, a feature transfer module 220, and a decoder 230. The feature extractor 210 may extract a feature from a corrected image or a distorted image. The decoder 230 may perform 3D object recognition based on the feature extracted from the image. The decoder 230 may output a 3D object recognition result.

The feature transfer module 220 may be trained to make the feature extracted from the distorted image the same as the feature extracted from the corrected image. The network model 200 may be that the trained feature transfer module 220 is inserted between the feature extractor 210 and the decoder 230.

Before the feature transfer module 220 is inserted, a network model composed of the feature extractor 210 and the decoder 230 may be pre-trained based on the corrected image.

After the feature transfer module 220 is inserted, fine-tuning may be performed based on the distorted image for the network model 200. The network model 200, the fine-tuning of which is completed, may output the same object recognition result as the result of receiving an uncorrected (or distorted) image, which is obtained by means of a camera of a vehicle, and performing object recognition for a corrected image of the received image.

Because the feature transfer module 220 is trained based on the feature extracted from the distorted image and the distorted image is generated using a rotation value in which roll, pitch, and/or yaw are/is variously adjusted, the network model 200 including the feature transfer module 220 may become robust to a change in roll, pitch, and yaw by movement of the vehicle.

Because the feature transfer module 220 is embedded in the network model 200, end-to-end processing of an object recognition process may be performed by a neural processing unit and a processing speed may be quicker than image signal processing such as distortion correction.

Because the network model 200 performs correction in a feature level, the performance of the network model 200 may be improved. This is because there is no need to distinguish training data for each camera with regard to distortion and rotation for each camera and an overfitting phenomenon by a change in the view of the camera may be reduced.

Figure 3:
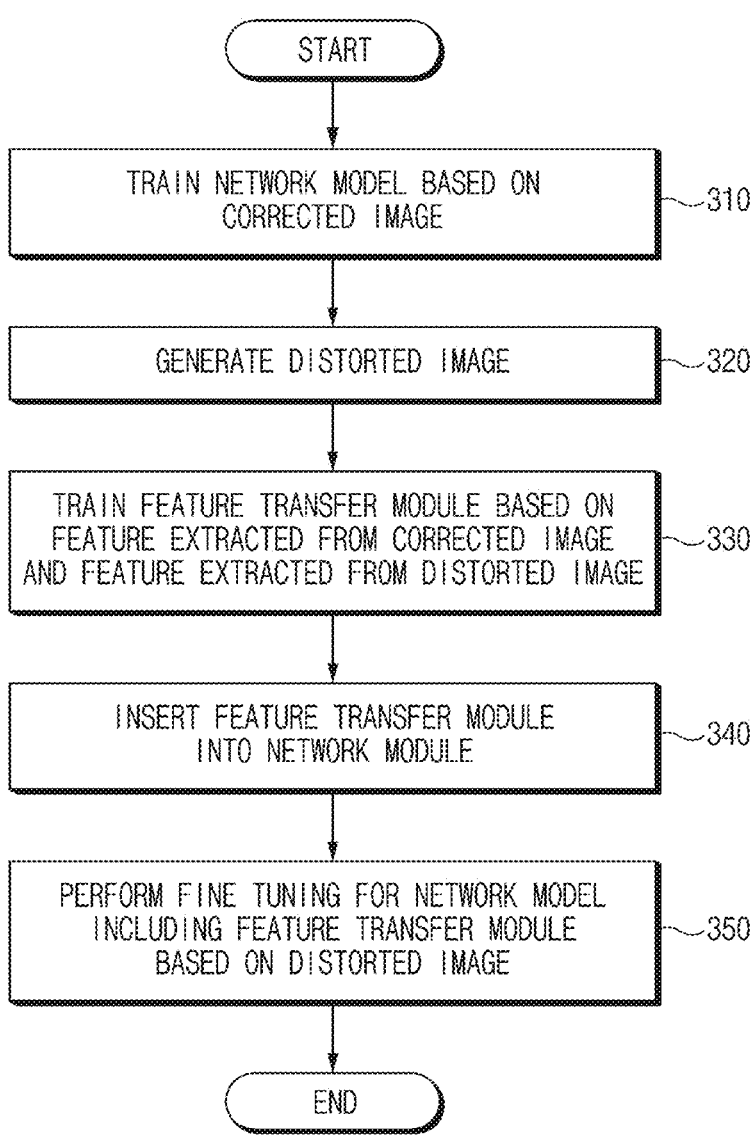
FIG. 3 is a flowchart for describing a training method of an object recognition apparatus according to an embodiment of the present disclosure.

FIG. 3 is a flowchart for describing a training method of an object recognition apparatus according to an embodiment of the present disclosure. Hereinafter, it is assumed that an object recognition apparatus 100 of FIG. 1 performs a process of FIG. 3. Furthermore, in a description of FIG. 3, an operation described as being performed by an object recognition apparatus 100 may be understood as being performed by a processor 110 of the object recognition apparatus 100.

In operation 310, the object recognition apparatus 100 may train a network model based on a corrected image. The object recognition apparatus 100 may train a first network model based on an image, distortion and rotation of which are corrected. The image, the distortion and the rotation of which are corrected, may be, for example, an image in which distortion and rotation of an image obtained by a camera loaded into a vehicle while the vehicle is traveling are corrected. The first network model may be a deep-learning network model, which is stored in the storage 120 of the object recognition apparatus 100 and performs object recognition based on an image. For example, the first network model may be composed of a feature extractor and a decoder. That the object recognition apparatus 100 trains the first network model in operation 310 may be referred to as a pre-training operation of the object recognition apparatus 100.

In operation 320, the object recognition apparatus 100 may generate a distorted image. The object recognition apparatus 100 may generate at least one distorted image based on the corrected image. For example, the object recognition apparatus 100 may input a specified distortion value and a specified rotation value to the corrected image to generate at least one distorted image in which distortion and rotation are generated. For example, the object recognition apparatus 100 may finely adjust the rotation value to be similar to a behavior of the vehicle and may input a plurality of different rotation values to a plurality of distorted images. The object recognition apparatus 100 may configure an image set including the corrected image and the at least one distorted image generated from the corrected image.

For example, the corrected image may be corrected using a distortion parameter of each camera, which is preset. For example, the corrected image may be corrected using at least one of an intrinsic parameter or an extrinsic parameter of the camera of the vehicle. For example, the intrinsic parameter of the camera may include a parameter indicating rotation of the camera itself. For example, the extrinsic parameter of the camera may include a parameter indicating rotation of a vehicle body. The object recognition apparatus 100 may reflect a predetermined distortion parameter and the intrinsic parameter and/or extrinsic parameter of the camera in an original image to perform correction.

For example, the object recognition apparatus 100 may generate at least one distorted image using the inverse transform of the operation corresponding to the correction. For example, the object recognition apparatus 100 may determine a distortion value and a rotation value corresponding to the inverse transform. The object recognition apparatus 100 may determine a distortion value based on the predetermined distortion parameter. The object recognition apparatus 100 may determine a rotation value based on the intrinsic parameter and/or the extrinsic parameter of the camera. For example, the object recognition apparatus 100 may select a plurality of rotation values in a level where a difference between the rotation values is not large (e.g., when the difference is less than a threshold). The object recognition apparatus 100 may generate a plurality of distorted images based on the plurality of different rotation values.

For example, the object recognition apparatus 100 may store a mapping function indicating an inverse transform relationship in the storage 120. The mapping function may be a function for converting a corrected image into a distorted image. The object recognition apparatus 100 may generate a mask image indicating an unmapped area on the distorted image and may store the mask image together with the mapping function.

In operation 330, the object recognition apparatus 100 may train a feature transfer module based on a feature extracted from the corrected image and a feature extracted from the distorted image. The object recognition apparatus 100 may train the feature transfer module based on the feature extracted from the corrected image and a feature extracted from each distorted image of at least one distorted image. The object recognition apparatus 100 may train the feature transfer module to make the feature extracted from each of the one or more distorted images the same as the feature extracted from the corrected image. The feature transfer module may include a feature transfer network model. That the object recognition apparatus 100 trains the feature transfer module may be that the object recognition apparatus 100 trains the feature transfer network model.

The feature transfer network model may be, for example, a deep-learning network model. The feature transfer network model may include an encoder and a decoder for each layer corresponding to each feature. For example, a size of a kernel of the encoder on each of the initial three layers of the feature transfer network model may be determined based on a size of a feature input to the feature transfer network model.

For example, the object recognition apparatus 100 may train the feature transfer network model based on a loss function including a shape-based loss, a mapping loss, a contra loss, and a discern loss. The smaller the shape-based loss, the mapping loss, and the contra loss and the larger the discern loss, the smaller value the loss function may be configured to have. The object recognition apparatus 100 may train the feature transfer network model such that the value of the loss function is minimized.

For example, the object recognition apparatus 100 may multiply a loss of an unmapped area on the distorted image by "0" and may multiply a loss of a mapped area by "1", thus calculating a value of the loss function. The object recognition apparatus 100 may identify an unmapped area on the distorted image based on the mask image.

In operation 340, the object recognition apparatus 100 may insert the feature transfer module into a network model. The object recognition apparatus 100 may insert the feature transfer module into the first network model pre-trained in operation 310. Hereinafter, the first network model into which the feature transfer module is inserted may be referred to as a second network model. The second network model may be composed of a feature extractor, a feature transfer module, and a decoder.

In operation 350, the object recognition apparatus 100 may perform fine-tuning for the network model including the feature transfer module based on the distorted image. The object recognition apparatus 100 may perform the fine-tuning for the second network model including the feature transfer module based on the at least one distorted image.

The object recognition apparatus 100 may perform operations 310 to 350 to train the network model, which recognizes an object that is present in a 3D space based on the image. The object recognition apparatus 100 may perform 3D object recognition even without correcting distortion and rotation in real time based on an image obtained by means of a camera of an autonomous vehicle using the trained network model. A description is given in detail of a process where the object recognition apparatus 100 performs object recognition using the trained network model with reference to FIG. 8.

Hereinafter, a description is given of a training method of an object recognition apparatus according to an embodiment with reference to FIGS. 4 and 7.

Figure 4:
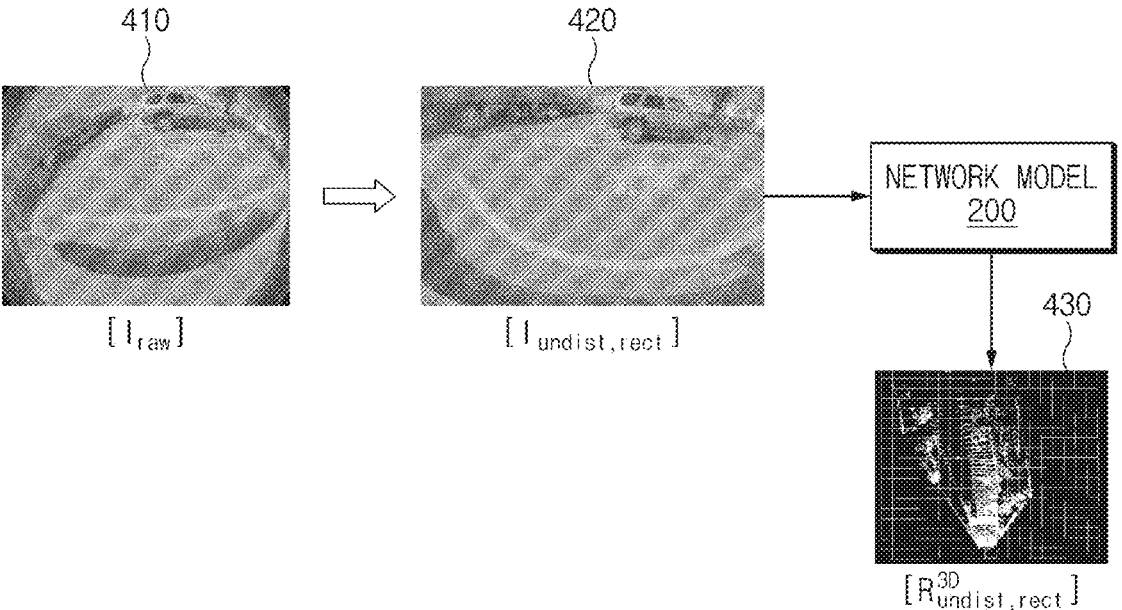
FIG. 4 is a drawing for describing a pre-training method of an object recognition apparatus according to an embodiment of the present disclosure.

FIG. 4 is a drawing for describing a pre-training method of an object recognition apparatus according to an embodiment of the present disclosure. It is assumed that operations, which are described below, are performed by an object recognition apparatus 100 of FIG. 1. Furthermore, in a description of FIG. 4, an operation described as being performed by an object recognition apparatus 100 may be understood as being performed by a processor 110 of the object recognition apparatus 100.

Referring to FIG. 4, the object recognition apparatus 100 may correct an original image 410 obtained by means of a camera loaded into a vehicle while the vehicle is traveling.

For example, the original image 410 may be represented as $I_{raw}$. The object recognition apparatus 100 may correct distortion and rotation of the original image 410 to obtain a corrected image 420. For example, the corrected image 420 may be represented as $I_{undist,rect}$.

The object recognition apparatus 100 may train a network model 200 based on the corrected image 420. The network model 200 may be a network model before being trained in the object recognition apparatus 100. The network model 200 before being trained may include, for example, a feature extractor 210 and a decoder 230.

The network model 200 may receive the corrected image 420 and may output a 3D object recognition result 430. The 3D object recognition result 430 may be represented as $R_{undist,rect}^{3D}$.

The operation where the object recognition apparatus 100 pre-trains the network model 200 based on the corrected image 420 may be expressed as Equation 2 below. In Equation 2 below, f may refer to the decoder 230 and g may refer to the feature extractor 210.

$$R_{undist,rect}^{3D} = f(g(I_{undist,rect})) \qquad \text{Equation 2}$$

Figure 5:
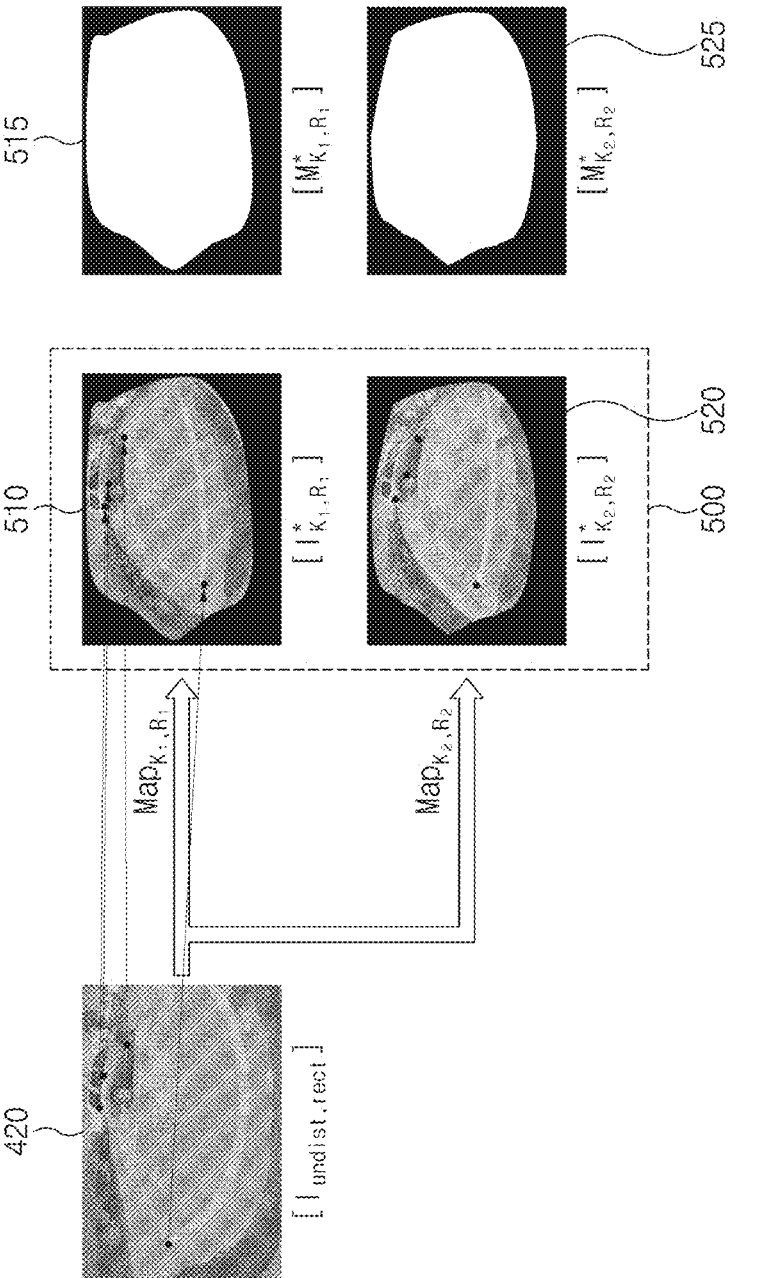
FIG. 5 is a drawing for describing a method for generating a distorted image in an object recognition apparatus according to an embodiment of the present disclosure.

FIG. 5 is a drawing for describing a method for generating a distorted image in an object recognition apparatus according to an embodiment of the present disclosure. It is assumed that operations, which are described below, are performed by an object recognition apparatus 100 of FIG. 1. Furthermore, in a description of FIG. 5, an operation described as being performed by an object recognition apparatus 100 may be understood as being performed by a processor 110 of the object recognition apparatus 100.

Referring to FIG. 5, the object recognition apparatus 100 may generate at least one distorted image 500 based on a corrected image 420. The at least one distorted image 500 may include, for example, a first distorted image 510 and a second distorted image 520. The object recognition apparatus 100 may input a specified distortion value $K_1$ and a specified rotation value $R_1$ to the corrected image 420 to generate the first distorted image 510. For example, the first distorted image 510 may be represented as $I*_{K_1,R_1}$. The object recognition apparatus 100 may input a specified distort value $K_2$ and a specified rotation value $R_2$ to the corrected image 420 to generate the second distorted image 520. For example, the second distorted image 520 may be represented as $I*_{K_2,R_2}$. For example, the specified distort values $K_1$ and $K_2$ may be set to a predetermined distortion parameter K. For example, the specified rotation value $R_1$ or $R_2$ may be set to a different rotation value in which at least one of yaw, pitch, or roll is finely adjusted.

The object recognition apparatus 100 may store a mapping function, which is a function for converting the corrected image 420 into the at least one distorted image 500. The mapping function may have an inverse transform relationship with the operation corresponding to correction. A first mapping function for converting the corrected image 420 into the first distorted image 510 may be represented as $Map_{K_1,R_1}$. A second mapping function for converting the corrected image 420 into the second distorted image 520 may be represented as $Map_{K_2,R_2}$. The operation where the object recognition apparatus 100 generates the at least one distorted image 500 based on the corrected image 420 may be expressed as Equation 3 below. In Equation 3 below, $I^*_{K,R}$ may refer to the distorted image and $\text{Map}_{K,R}$ may refer to the mapping function.

$$I^*_{K,R} = \text{Map}_{K,R}(I_{undist,rect}) \qquad \text{Equation 3}$$

The object recognition apparatus 100 may generate a mask image indicating an unmapped area on the distorted image and may store the mask image together with the mapping function. For example, the mask image may indicate a free space on the distorted image, which is generated by rotation. For example, the free space may include an outer part of the image. The object recognition apparatus 100 may store a first mask image 515 corresponding to the first distorted image 510 together with a first mapping function. For example, the first mask image 515 may be represented as $\text{Map}^*_{K_1,R_1}$. The object recognition apparatus 100 may store a second mask image 525 corresponding to the second distorted image 520 together with a second mapping function. The second mask image 525 may be represented as $\text{Map}^*_{K_2,R_2}$.

Figure 6:
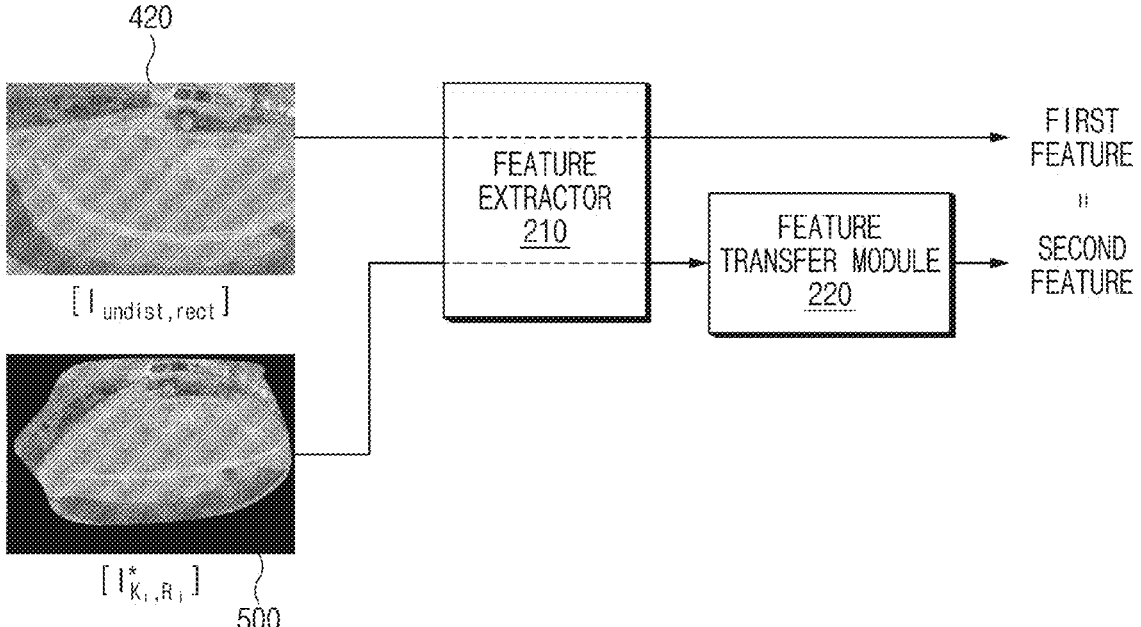
FIG. 6 is a drawing for describing a method for training a features transfer module in an object recognition apparatus according to an embodiment of the present disclosure.

FIG. 6 is a drawing for describing a method for training a feature transfer module in an object recognition apparatus according to an embodiment of the present disclosure. It is assumed that operations, which are described below, are performed by an object recognition apparatus 100 of FIG. 1. Furthermore, in a description of FIG. 6, an operation described as being performed by an object recognition apparatus 100 may be understood as being performed by a processor 110 of the object recognition apparatus 100.

Referring to FIG. 6, the object recognition apparatus 100 may train a feature transfer module 220 based on a feature extracted from a corrected image 420 and a feature extracted from each distorted image of at least one distorted image 500. For example, the at least one distorted image may be represented as $I^*_{K_i,R_i}$. The object recognition apparatus 100 may train the feature transfer module 220 to make the feature extracted from each distorted image of the at least one distorted image 500 the same as the feature extracted from the corrected image 420.

For example, the object recognition apparatus 100 may train the feature transfer module 220 such that a value of a loss function including a shape-based loss, a mapping loss, a contra loss, and a discern loss is minimized. The smaller the shape-based loss, the mapping loss, and the contra loss and the larger the discern loss, the smaller the value of the loss function may be. The object recognition apparatus 100 may multiply a loss of an unmapped area on the distorted image by "0" and may multiply a loss of a mapped area by "1", thus calculating a value of the loss function. The object recognition apparatus 100 may identify an unmapped area of a distorted image using a previously obtained (or calculated) mask image (e.g., a first mask image 515 or a second mask image 525 of FIG. 5).

For example, the object recognition apparatus 100 may extract a first feature from the corrected image 420 by means of a feature extractor 210. The object recognition apparatus 100 may extract a feature of each distorted image of the at least one distorted image 500 by means of the feature extractor 210 and may input the extracted feature to the feature transfer module 200 to extract a second feature. The first feature and the second feature may be the same as each other.

The object recognition apparatus 100 may insert the trained feature transfer module 220 into a network model 200. For example, the object recognition apparatus 100 may insert the trained feature transfer module 220 between the feature extractor 210 and a decoder 230. The feature transfer module 220, the training of which is completed, may be represented as an equation such as Equation 4 below. In Equation 4 below, T may refer to the feature transfer module 220 or a feature transfer function and g may refer to the feature extractor 210.

$$g(I_{undist,rect}) = T(g(I^*_{K_1,R_1})) = T(g(I^*_{K_2,R_2})) = \ldots \qquad \text{Equation 4}$$

Figure 7:
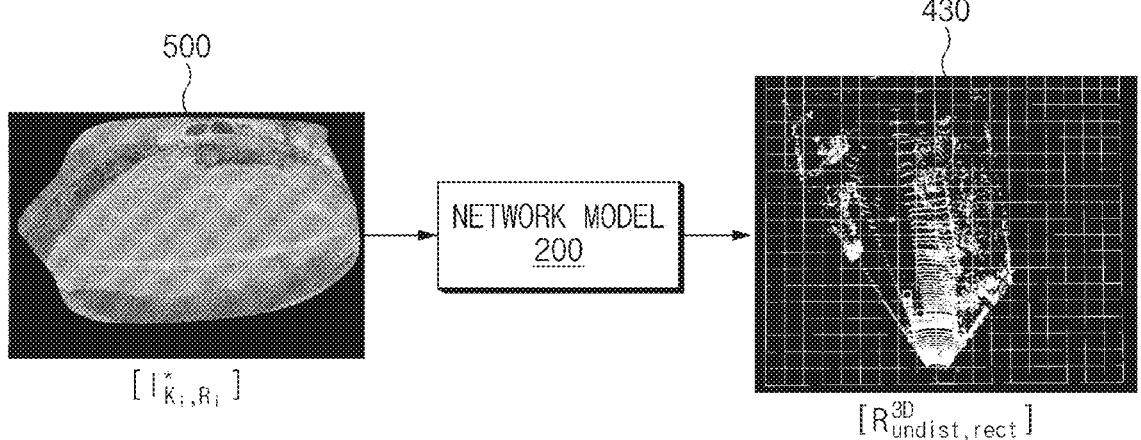
FIG. 7 is a drawing illustrating a fine-tuning method of an object recognition apparatus according to an embodiment of the present disclosure.

FIG. 7 is a drawing illustrating a fine-tuning method of an object recognition apparatus according to an embodiment of the present disclosure. It is assumed that operations, which are described below, are performed by an object recognition apparatus 100 of FIG. 1. Furthermore, in a description of FIG. 7, an operation described as being performed by an object recognition apparatus 100 may be understood as being performed by a processor 110 of the object recognition apparatus 100.

Referring to FIG. 7, the object recognition apparatus 100 may perform fine-tuning for a network model 200 including a feature transfer module 220 based on at least one distorted image 500. The object recognition apparatus 100 may input the at least one distorted image 500 to the network model 200 including the feature transfer module 220 and may perform fine-tuning to output the same result (e.g., a 3D object recognition result 430 of FIG. 4) as the case where a corrected image 420 is input.

The operation where the object recognition apparatus 100 performs the fine-tuning may be expressed as Equation 5 below. In Equation 5 below, f may refer to the decoder 230, T may refer to the feature transfer module 220, and g may refer to the feature extractor 210.

$$f(T(g(I^*_{K_1,R_1}))) = f(T(g(I^*_{K_2,R_2}))) =$$
$$f(T(g(I^*_{K_3,R_3}))) = \ldots = f(g(I_{undist,rect})) = R^{3D}_{undist,rect} \qquad \text{Equation 5}$$

Figure 8:
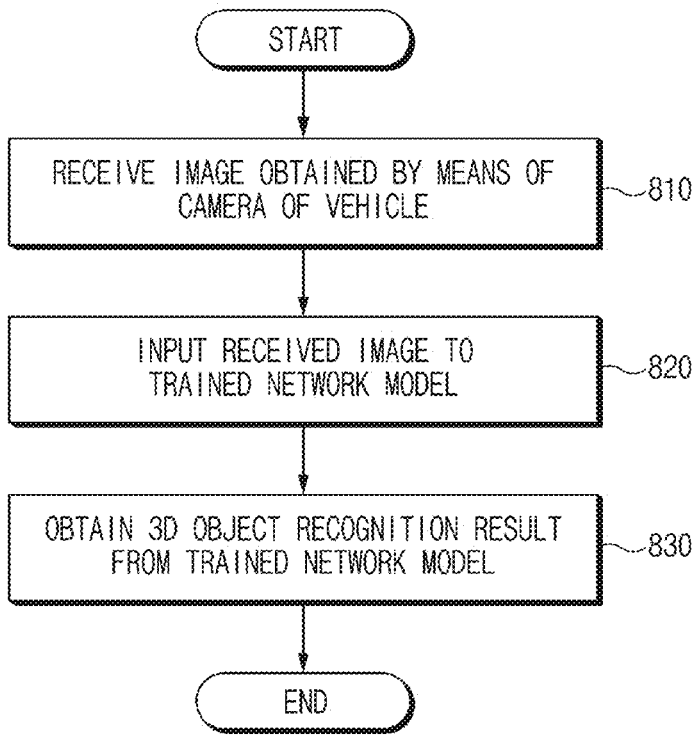
FIG. 8 is a flowchart illustrating an operation method of an object recognition apparatus according to an embodiment of the present disclosure.

FIG. 8 is a flowchart illustrating an operation method of an object recognition apparatus according to an embodiment of the present disclosure. Hereinafter, it is assumed that an object recognition apparatus 100 of FIG. 1 performs a process of FIG. 8. Furthermore, in a description of FIG. 8, an operation described as being performed by an object recognition apparatus 100 may be understood as being performed by a processor 110 of the object recognition apparatus 100.

In operation 810, the object recognition apparatus 100 may receive an image obtained by means of a camera of a vehicle. For example, the object recognition apparatus 100 may receive an image from the camera of an autonomous vehicle.

In operation 820, the object recognition apparatus 100 may input the received image to a trained network model. The object recognition apparatus 100 may input the received image to a network model including a feature transfer module 220.

In operation 830, the object recognition apparatus 100 may obtain a 3D object recognition result from the trained network model. The object recognition apparatus 100 may obtain the 3D object recognition result from the network model including the feature transfer module 220. The object recognition apparatus 100 may correct distortion and rotation for the image received from the camera of the autonomous vehicle and may then obtain the same result as the result of performing 3D object recognition for the corrected image. The obtained 3D object recognition result may include a location and a type of an object that is present in a 3D space.

Figure 9:
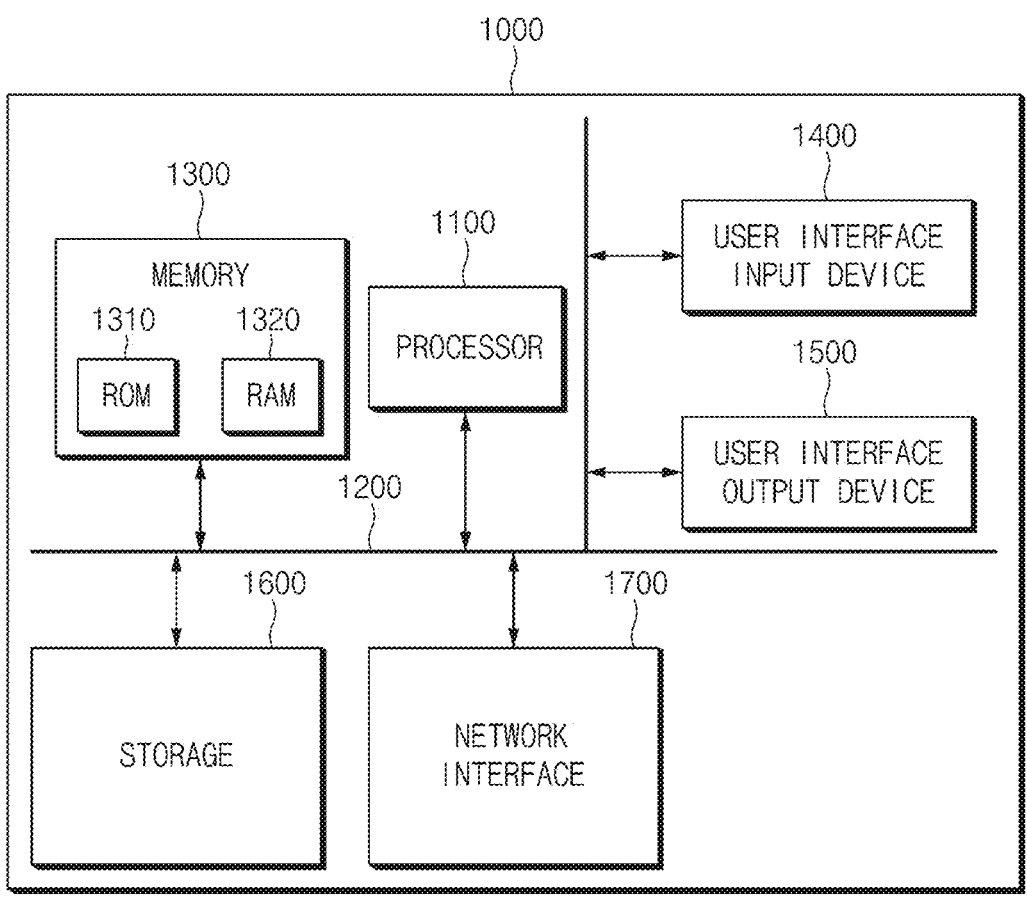
FIG. 9 is a block diagram illustrating a computing system according to an embodiment of the present disclosure.

FIG. 9 is a block diagram illustrating a computing system according to an embodiment of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read-only memory (ROM) 1310 and a random-access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (e.g., the memory 1300 and/or the storage 1600) such as a random-access memory (RAM), a flash memory, a read-only memory (ROM), an erasable programmable ROM (EPROM), an electrically EPROM (EEPROM), a register, a hard disc, a removable disk, and a compact-disc ROM (CD-ROM).

The storage medium may be coupled to the processor 1100. The processor 1100 may read out information from the storage medium and may write information in the storage medium. Alternatively, the storage medium may be integrated with the processor 1100. The processor and the storage medium may reside in an application-specific integrated circuit (ASIC). The ASIC may reside within a user terminal. In another case, the processor and the storage medium may reside in the user terminal as separate components.

The present technology may provide the image-based 3D object recognition apparatus that is robust to a change in a parameter of a camera loaded into a vehicle and may provide the object recognition method therefor.

Furthermore, the present technology may reduce an excessive amount of calculation of the object recognition apparatus and may reduce a deterioration in performance, because of not requiring a process of correcting an image obtained while the vehicle is traveling in real time based on a parameter of the camera.

In addition, various effects ascertained directly or indirectly through the present disclosure may be provided.

Hereinabove, although the present disclosure has been described with reference to embodiments and the accompanying drawings, the present disclosure is not limited thereto. The embodiments and the present disclosure may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

What is claimed is:

1. An object recognition apparatus for an autonomous vehicle, the object recognition apparatus comprising:
   a processor; and
   storage storing a deep-learning network model for performing object recognition based on an image,
   wherein the processor is configured to
      train a first network model based on an image,
      correct a distortion and a rotation of the image,
      generate at least one distorted image based on the corrected image,
      train a feature transfer module based on a feature extracted from the corrected image and a feature extracted from the at least one distorted image,
      insert the feature transfer module into the first network model, and
      perform fine-tuning for a second network model including the feature transfer module based on the at least one distorted image.

2. The object recognition apparatus of claim 1, wherein the processor is configured to:
   input a specified distortion value and a specified rotation value to the corrected image to generate the at least one distorted image in which distortion and rotation are generated.

3. The object recognition apparatus of claim 1, wherein
   the corrected image is corrected using at least one of an intrinsic parameter or an extrinsic parameter of a camera of the autonomous vehicle, and
   the processor is configured to generate the at least one distorted image using an inverse transform of an operation corresponding to the correction.

4. The object recognition apparatus of claim 3, wherein the processor is configured to:
   store a mapping function indicating a relationship of the inverse transform; and
   generate a mask image indicating an unmapped area on the at least one distorted image and store the mask image together with the mapping function.

5. The object recognition apparatus of claim 1, wherein the processor is configured to:
   train the feature transfer module to make the feature extracted from each distorted image of the at least one distorted image the same as the feature extracted from the corrected image.

6. The object recognition apparatus of claim 5, wherein
   the feature transfer module includes a feature transfer network model, and
   the feature transfer network model is trained based on a loss function including a shape-based loss, a mapping loss, a contra loss, and a discern loss.

7. The object recognition apparatus of claim 6, wherein the processor is configured to:
   multiply a loss of an unmapped area on the distorted image by "0" and multiply a loss of a mapped area by "1" to calculate a value of the loss function.

8. The object recognition apparatus of claim 6, wherein a size of a kernel of an encoder on each of initial three layers of the feature transfer network model is determined based on a size of a feature input to the feature transfer network model.

9. The object recognition apparatus of claim 1, wherein the processor is configured to:

receive an image obtained by means of a camera of the autonomous vehicle while the autonomous vehicle is traveling;

input the received image to the second network model; and obtain an object recognition result from the second network model.

10. The object recognition apparatus of claim 9, wherein the object recognition result includes a location and a type of an object present in a three-dimensional (3D) space.

11. An object recognition method performed by an object recognition apparatus for an autonomous vehicle, the object recognition method comprising:

training a first network model based on an image, correcting distortion and rotation of the image;

generating at least one distorted image based on the corrected image;

training a feature transfer module based on a feature extracted from the corrected image and a feature extracted from the at least one distorted image;

inserting the feature transfer module into the first network model; and performing fine-tuning for a second network model including the feature transfer module based on the at least one distorted image, wherein each of the first network model and the second network model are a deep-learning network model for performing object recognition based on an image.

12. The object recognition method of claim 11, wherein generating the at least one distorted image includes:

inputting a specified distortion value and a specified rotation value to the corrected image to generate the at least one distorted image in which distortion and rotation are generated.

13. The object recognition method of claim 11, wherein the corrected image is corrected using at least one of an intrinsic parameter or an extrinsic parameter of a camera of the autonomous vehicle, and generating the at least one distorted image includes generating the at least one distorted image using an inverse transform of operation corresponding to the correction.

14. The object recognition method of claim 13, further comprising:

storing a mapping function indicating a relationship of the inverse transform; and generating a mask image indicating an unmapped area on the at least one distorted image and storing the mask image together with the mapping function.

15. The object recognition method of claim 11, wherein the training of the feature transfer module includes:

training the feature transfer module to make the feature extracted from each distorted image of the at least one distorted image the same as the feature extracted from the corrected image.

16. The object recognition method of claim 15, wherein the feature transfer module includes a feature transfer network model, and the feature transfer network model is trained based on a loss function including a shape-based loss, a mapping loss, a contra loss, and a discern loss.

17. The object recognition method of claim 16, wherein training the feature transfer module includes:

multiplying a loss of an unmapped area on the distorted image by "0" and multiplying a loss of a mapped area by "1" to calculate a value of the loss function.

18. The object recognition method of claim 16, wherein a size of a kernel of an encoder on each of initial three layers of the feature transfer network model is determined based on a size of a feature input to the feature transfer network model.

19. The object recognition method of claim 11, further comprising:

receiving an image obtained by means of a camera of the autonomous vehicle while the autonomous vehicle is traveling;

inputting the received image to the second network model; and obtaining an object recognition result from the second network model.

20. The object recognition method of claim 19, wherein the object recognition result includes a location and a type of an object present in a 3D space.

* * * * *